(12) United States Patent
Inoue

(10) Patent No.: US 10,008,079 B2
(45) Date of Patent: Jun. 26, 2018

(54) WRISTWATCH-TYPE NOTIFICATION APPARATUS

(71) Applicant: Seiko Epson Corporation, Tokyo (JP)

(72) Inventor: Katsutoyo Inoue, Azumino (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/414,989

(22) Filed: Jan. 25, 2017

(65) Prior Publication Data

US 2017/0221321 A1    Aug. 3, 2017

(30) Foreign Application Priority Data

Jan. 28, 2016   (JP) .................................. 2016-014378

(51) Int. Cl.
| | | |
|---|---|---|
| G08B 1/08 | (2006.01) | |
| G08B 5/22 | (2006.01) | |
| H04W 68/00 | (2009.01) | |
| G04G 9/00 | (2006.01) | |

(52) U.S. Cl.
CPC .............. *G08B 5/228* (2013.01); *G04G 9/00* (2013.01); *G04G 9/0064* (2013.01); *G08B 5/225* (2013.01); *H04W 68/005* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,223,522 A | * | 9/1980 | Nomura | .................... | G04C 3/14 368/220 |
| 4,253,172 A | * | 2/1981 | Nomura | .................... | G04C 3/14 368/249 |
| 4,259,737 A | * | 3/1981 | Berney | .................... | G04C 3/14 368/111 |
| 4,433,918 A | * | 2/1984 | Nishimura | ............. | G04C 3/146 368/185 |
| 4,470,706 A | * | 9/1984 | Nishimura | ............... | G04C 3/14 368/251 |
| 5,457,664 A | * | 10/1995 | Izukawa | ................. | G04G 19/12 368/203 |
| 8,456,959 B2 | | 6/2013 | Fujisawa | | |

FOREIGN PATENT DOCUMENTS

JP      2011-021929 A    2/2011

* cited by examiner

*Primary Examiner* — Travis Hunnings
(74) *Attorney, Agent, or Firm* — Harness, Dickey & Pierce, P.L.C.

(57) ABSTRACT

A wristwatch-type notification apparatus that displays information by using indicating hands includes a display section that drives and rotates one or more of the plurality of indicating hands to notify a user of time information and a notification section that notifies the user of event information representing that a pre-specified condition is satisfied by moving, on the basis of a trigger produced in accordance with the event information, an indicating hand to a display position specified in accordance with the type of the event information associated with the trigger and causing the indicating hand to make reciprocating motion in the forward and reverse directions over a range including the display position.

12 Claims, 8 Drawing Sheets

WRISTWATCH-TYPE NOTIFICATION APPARATUS

BACKGROUND

1. Technical Field

The present invention relates to a wristwatch-type notification apparatus.

2. Related Art

An analog-display wristwatch of related art that displays time and other pieces of information by using indicating hands has a beautiful exterior appearance and traditional design that creates an orthodox atmosphere and therefore tends to be used as a preferred choice in a business scene, a formal scene, and other situations. Further, as a functional aspect of an analog-display wristwatch, the position and movement of each of the indicating hands allow instantaneous understanding of where the indicating hand is currently positioned and how the indicating hand is changing, whereby the following position and movement of the indicating hand can be readily anticipated, and displayed information can be visually and quickly grasped.

In recent years, a trend of a multifunctional wristwatch provided with a communication function and other functions or otherwise enhanced has advanced, and an analog-display wristwatch is therefore also required to increase the amount of displayed information. JP-A-2011-021929, for example, discloses a technology for displaying an alarm and other types of notification in the form of the position of an indicating hand in an analog-display timepiece. In the wristwatch described in JP-A-2011-021929, a notifier that changes at least one of the rotation speeds of an indicating hand and the rotation direction thereof for notification to, for example, notify a wearer that alarm time has been reached and a call or a message has arrived at another communication apparatus.

The technology disclosed in JP-A-2011-021929 described above, however, relates to notification of information simply by changing the rotation speed of an indicating hand or the rotation direction thereof and therefore has a problem of insufficient variation in expressible information. For example, the timepiece described in JP-A-2011-021929 allows the wearer to recognize that alarm time has been reached in the form of, for example, a change in the rotation speed of an indicating hand, but the amount of information of which the wearer can be notified is limited.

SUMMARY

An advantage of some aspects of the invention is to provide a wristwatch-type notification apparatus capable of diversifying indicating hand expression in correspondence with an increase in the amount of information.

A wristwatch-type notification apparatus according to an aspect of the invention includes a display section that uses one or more indicating hands to notify a user of information and a notification section that notifies the user of predetermined information representing that a predetermined condition is satisfied by moving, on the basis of a trigger produced in accordance with the predetermined information, the indicating hand to a display position specified in accordance with the predetermined information and causing the indicating hand to make reciprocating motion in forward and reverse directions over a range including the display position.

According to the aspect described above, in the normal operation, information on the time, calendar, and other factors of which the user should be originally notified by the indicating hand, information on a value measured with a sensor, and information representing a mode are displayed, whereas when unexpected event processing occurs, for example, when alarm time has been reached and when a mail message has arrived, the indicating hand is moved to the display position specified in accordance with the type of the predetermined information associated with the produced trigger, and the indicating hand is then caused to make reciprocating motion in the forward and reverse directions over the range including the display position. The user can grasp by looking at the reciprocating motion of the indicating hand that a trigger has been produced and can also quickly grasp the type of the produced trigger by looking at the range over which the indicating hand is making the reciprocating motion at the instant of visual recognition. The information of which the user is notified by using one or more indicating hands is preferably time information.

In the aspect described above, it is preferable that the predetermined information includes first information and second information, which belongs to a hierarchy lower than the hierarchy to which the first information belongs, and that the notification section moves the indicating hand to the display position according to the first information and causes the indicating hand to make reciprocating motion in the forward and reverse directions over a range including the display position in accordance with the second information.

According to the aspect described above, the first information, which belongs to a hierarchy higher than the hierarchy to which the second information belongs, is displayed by using the display position. The display position of the indicating hand can be grasped at the instant of visual recognition. On the other hand, the second information, which belongs to a hierarchy lower than the hierarchy to which the first information belongs, is displayed by causing the indicating hand to make reciprocating motion in the forward and reverse directions. It takes longer time to grasp the reciprocating motion of the indicating hand than the time required to grasp the display position of the indicating hand. Information that belongs to an upper hierarchy can therefore be so displayed as to be more readily grasped, whereby user friendliness can be improved.

In the aspect described above, the notification section may change an amplitude of the reciprocating motion in accordance with the second information. Further, the predetermined information may include third information, which belongs to a hierarchy lower than the hierarchy to which the second information belongs, and the notification section may change a speed of the reciprocating motion in accordance with the third information. In this case, since the user is notified of the second information and the third information in different aspects of the reciprocating motion of the indicating hand, such as the amplitude of the reciprocating motion and the speed of the reciprocating motion, the number of hierarchies of the predetermined information can be increased.

In the aspect described above, it is preferable that the notification section changes a speed of the reciprocating motion in accordance with the second information. Further, it is preferable that the predetermined information includes third information, which belongs to a hierarchy lower than the hierarchy to which the second information belongs, and that the notification section changes an amplitude of the reciprocating motion in accordance with the third information. In this case, since the user is notified of the second information and the third information in different aspects of the reciprocating motion of the indicating hand, such as the speed of the reciprocating motion and the amplitude of the reciprocating motion, the number of hierarchies of the predetermined information can be increased.

In the aspect described above, it is preferable that the notification section includes a pre-informing section that informs the user before the notification section notifies the user of the predetermined information that the notification section starts the notification. According to the aspect described above, the pre-informing section can call the user's attention, whereby the user can be effectively notified of the predetermined information.

In the aspect described above, it is preferable that, in a case where the trigger having occurred is formed of a plurality of triggers associated with the predetermined information, the notification section notifies the user of the predetermined information in accordance with priority specified in advance in association with the predetermined information. According to the aspect described above, the user is notified of the predetermined information in the priority order instead of the chronological order, whereby the use of the notification can be improved.

In the aspect described above, it is preferable that the display section notifies the user of the information by driving and rotating the one or more indicating hands or displaying an image of the one or more indicating hands. According to the aspect described above, time information may be displayed by using the indicating hand that is an actual structure or may be displayed in the form of an image. In the case where the time information is displayed in the form of an image, the indicating hand can be expressed by segments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
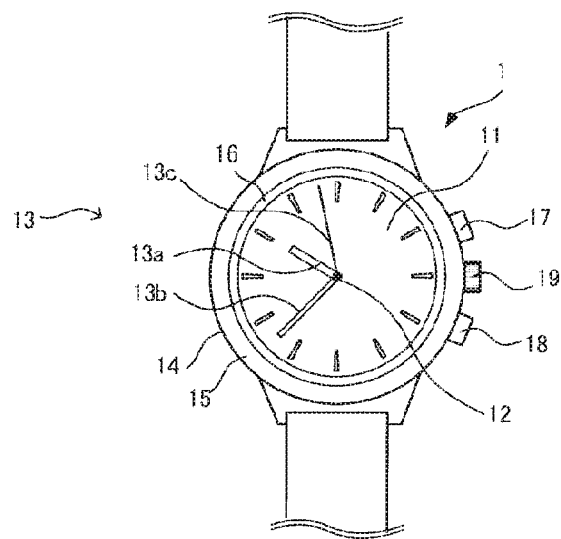
FIG. 1 is an exterior view showing an example of a wristwatch-type notification apparatus according to a first embodiment of the invention.

Embodiments of the invention will be described in detail with reference to the drawings. In the following description, members having the same function and providing the same effect has the same reference characters and will not be described.

First Embodiment

Configuration of Wristwatch-Type Notification Apparatus 1

A summary of a wristwatch-type notification apparatus according to the present embodiment will be described with reference to FIG. 1. FIG. 1 shows is an exterior view of the wristwatch-type notification apparatus 1 according to the present embodiment.

The wristwatch-type notification apparatus 1 according to the present embodiment is a typical analog wristwatch attached to an arm, as shown in FIG. 1. The wristwatch-type notification apparatus 1 includes a cylindrical exterior case 14, which is formed of a non-conducting member made, for example, of a ceramic material (zirconia), and is so configured in exterior appearance that an annular bezel 15, which is formed of a non-conducting member made, for example, of a ceramic or plastic material, is fit to the front-side circumferential edge of the exterior case 14. Inside the bezel 15, a disk-shaped dial 11 is disposed as a time display portion via an annular dial ring 16, which is made of a plastic material, and on the dial 11 are provided bar-type indices at angular intervals of 30 degrees and further disposed an hour indicating hand 13a, which displays the hour, a minute indicating hand 13b, which displays the minute, and a second indicating hand 13c, which displays the second. In the following description, the hour indicating hand 13a, the minute indicating hand 13b, and the second indicating hand 13c are collectively referred to as indicating hands 13 in some cases. A front-side opening of the exterior case 14 is closed with a cover glass plate via the bezel 15, and the dial 11 and the indicating hands 13 inside the exterior case 14 are visually recognizable through the cover glass plate.

In the thus configured wristwatch-type notification apparatus 1, the plurality of indicating hands 13 rotate around an indicating hand shaft 12 to notify a user of time information. The "time information" used herein includes information on the time, such as the hour, minute, month, date, and day, information on a calendar, and other pieces of information in a typical timepiece.

A crown 19 and operation buttons 17 and 18 are provided on the outer side of the exterior case 14. Movement of the operation button 17 (or 18) produced when the user of the wristwatch-type notification apparatus 1 presses the operation button 17 (or 18) is transmitted to a switch that is not shown via a button shaft passing through the exterior case 14. The switch then converts the pressure from the operation button 17 (or 18) into an electric signal and transmits the electric signal to a system controller 100.

Movement of the crown 19 produced when the user operates the crown 19 is transmitted to the system controller 100 via an input interface that is not shown. For example, in a case where the crown 19 is operated in three steps, the following states can be achieved: In the state in which the crown 19 is fully pressed, regular time is displayed; in the state in which the crown 19 is pulled one step, the date and day are corrected; and in the state in which the crown 19 is pulled two steps, time correction and system reset are performed. Further, the input interface can detect rotation only when the crown 19 is pulled one or two steps, and the date/day or the time can be increased or decreased.

The wristwatch-type notification apparatus 1 according to the present embodiment is not only a wristwatch but also a notification apparatus that notifies the user of information. That is, the wristwatch-type notification apparatus 1 uses one or more of the indicating hands to notify the user of occurrence of an event on the basis of a trigger produced in accordance with hierarchized predetermined information representing that a predetermined condition is satisfied. The "predetermined information" used herein includes information on processing of an event that unexpectedly occurs, such as an event in which alarm time has been reached and an event in which a telephone call or an electronic mail message has arrived at and has been received by the apparatus 1 or another communication apparatus.

Figure 2:
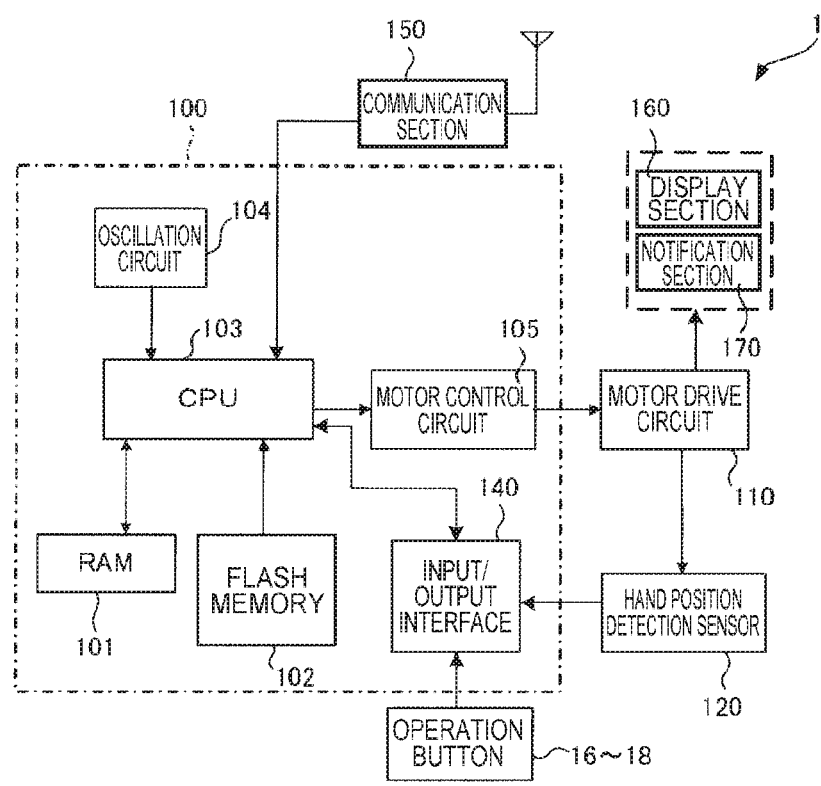
FIG. 2 is a block diagram showing an example of a key part configuration of the wristwatch-type notification apparatus according to the first embodiment.
Figure 3:
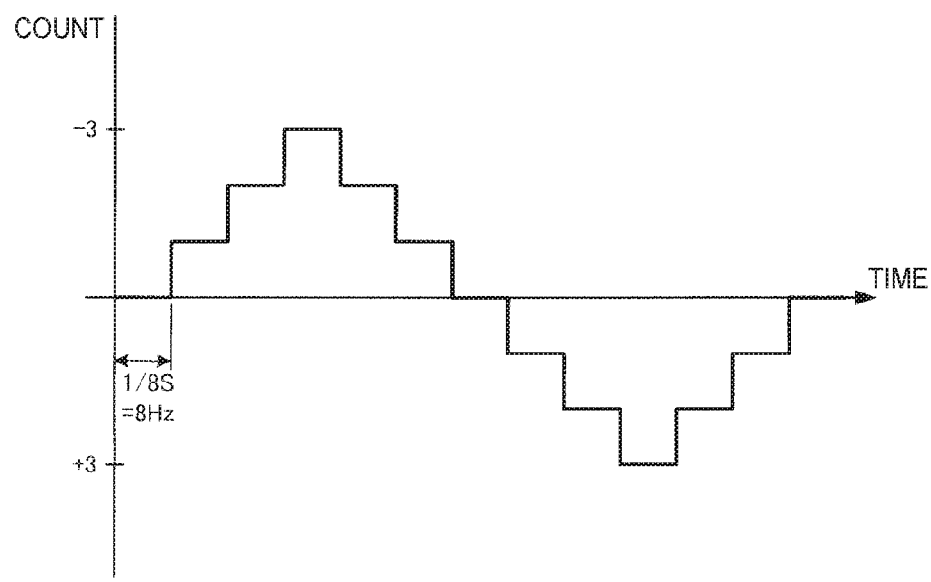
FIG. 3 is a sequence diagram showing an example of a pulse signal that controls a stepper motor that drives an indicating hand in the wristwatch-type notification apparatus according to the first embodiment.
Figure 4:
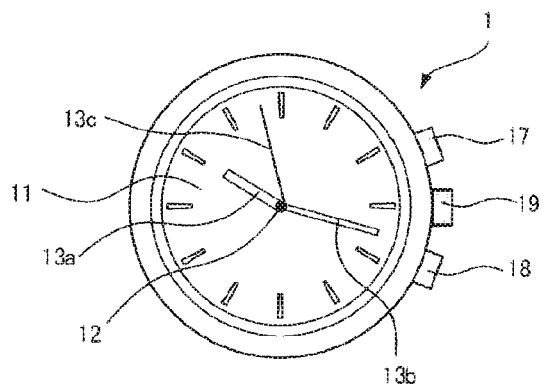
FIG. 4 is an exterior view showing an example of a state in which the wristwatch-type notification apparatus according to the first embodiment of the invention performs notification.

An event occurrence notifying configuration in the wristwatch-type notification apparatus 1 will be described. FIG. 2 is a block diagram showing a key part configuration of the wristwatch-type notification apparatus 1 according to the present embodiment, and FIG. 3 is a sequence diagram showing an example of a pulse signal that controls a stepper motor that drives an indicating hand. FIG. 4 is an exterior view showing a state in which the wristwatch-type notification apparatus 1 according to the present embodiment performs notification.

The wristwatch-type notification apparatus 1 includes the system controller 100, a motor drive circuit 110, a hand position detection sensor 120, an input/output interface 140, a communication section 150, a display section 160, and a notification section 170, as shown in FIG. 2.

The motor drive circuit 110 causes the display section 160 to display the current time on one hand and causes the notification section 170 to perform notification action of notifying the user of occurrence of a predetermined event on the other hand under the control of a motor control circuit 105. The display section 160 notifies the user of the time information. In the present embodiment, the display section 160 notifies the user of current time information by driving and rotating one or more of the indicating hands 13. The notification section 170 notifies the user of an event representing that a pre-specified condition has been satisfied. In the present embodiment, the notification section 170 notifies the user of an event by driving one or more of the indicating hands 13 disposed on the dial 11.

Figure 5:
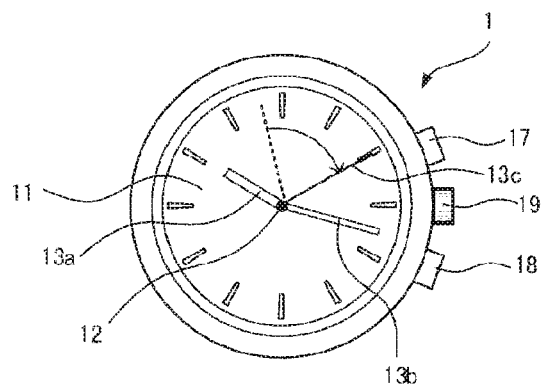
FIG. 5 is an exterior view showing an example of the state in which the wristwatch-type notification apparatus according to the first embodiment performs notification.
Figure 6:
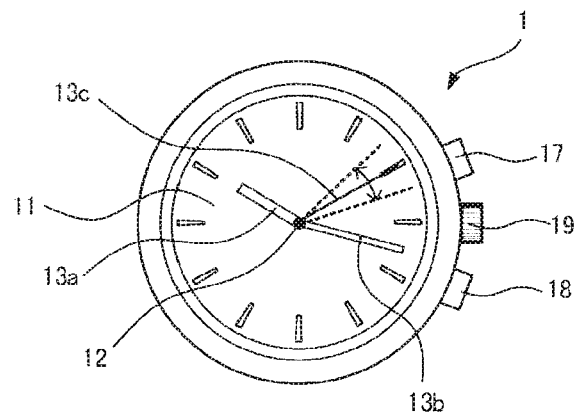
FIG. 6 is an exterior view showing an example of the state in which the wristwatch-type notification apparatus according to the first embodiment performs notification.

Specifically, when the notification section 170 in a state in which regular time is displayed, as shown in FIG. 4, acquires a trigger produced in accordance with an event, the notification section 170 notifies the user of the event by moving, on the basis of the trigger, an indicating hand 13 to a specified display position (the 2 o'clock position in the example shown in FIG. 5), as shown in FIG. 5, in accordance with the type of the event associated with the trigger and causing the indicating hand 13 to make reciprocating motion over a range including the display position, as shown in FIG. 6. The amplitude of the reciprocating motion can range, for example, from ±1 to 5 with the 2 o'clock position taken as the center of the reciprocating motion. In the example shown in FIG. 6, the indicating hand 13 is caused to make reciprocating motion over the range of ±3 steps at a frequency of 8 Hz, as shown in FIG. 3.

In the present embodiment, the second indicating hand 13c is driven in FIGS. 4 to 6, but the second indicating hand 13c is not necessarily driven and the hour indicating hand 13a or the minute indicating hand 13b may be driven in another embodiment the invention. Further, instead of driving only one indicating hand, a plurality of the indicating hands may be simultaneously driven.

The hand position detection sensor 120 is formed of an optical detection sensor that detects a reference position of an indicating hand and a counter that counts pulses, and the hand position detection sensor 120 detects the position of an indicating hand 13 and detects that the indicating hand 13 has made a full turn. The hand position detection sensor 120 detects the position of the second indicating hand 13c in accordance with notification action performed by the notification section 170 and transmits a result of the detection to a CPU 103 via the input/output interface 140.

The input/output interface 140 is an interface to which operation signals from operation devices, such as the crown 19 and operation buttons 17 and 18, and an operation signal acquired via the communication section 150 are inputted as the user's operation and which outputs voice through a loudspeaker or any other component. The input/output interface 140 accepts, as an input interface, event setting inputted by the user. In the present embodiment, the user can input event setting by operating the operation buttons 17 and 18. In a case where an event is an alarm, the event setting is action of setting time ("7:00 AM" and "6:00 PM," for example) set by the user as time at which the user is notified of the alarm. In a case where an event unexpectedly occurs, such as a telephone call or an electronic mail message having arrived at and having been received by another communication apparatus, the event setting includes setting the type of application having arrived (such as making call, sending mail message, and using SNS), the counterpart at arrival destination (such as parents, wife, children, and business-related persons), the importance of the communication, and other factors. The input/output interface 140 further accepts notification action terminating operation performed via the operation button 17 or 18.

The communication section 150 is connected to a mobile terminal held by the user over a wireless or wired communication network. In the case where wireless communication is established, the communication section 150 can be connected to the mobile terminal, for example, on the basis of wireless communication using a protocol for data communication, such as Wi-Fi (registered trademark), or short-range wireless communication, such as Bluetooth (registered trademark) and ZigBee (registered trademark, IEEE 802.15.4), but not necessarily. When a telephone call or a mail message arrives at the mobile terminal, the mobile terminal transmits information representing the arrival to the communication section 150.

The communication network is not only an IP network using the communication protocol TCP/IP but also a distributed communication network formed of a variety of communication lines (telephone line, ISDN line, ADSL line, optical line and other public lines, dedicated line, and 3G line, 4G line, LTE line, and Wi-Fi (registered trademark), Bluetooth (registered trademark), and other wireless communication networks) connected to each other. The IP network further includes an intranet (office network) using 10 BASE-T, 100 BASE-TX, or any other standard and a LAN, such as a home network.

The mobile terminal is an information processing terminal possessed by an individual user and having a computation function using a CPU and a communication function using a communication interface. The mobile terminal can be achieved in the form of a personal computer or any other general-purpose computer or a dedicated apparatus having a special function. Examples of the mobile terminal include a mobile computer, a PDA (personal digital assistance), a mobile phone, a smartphone, and a tablet PC.

The system controller 100 includes the CPU 103, a flash memory 102, a RAM 101, an oscillation circuit 104, and the motor control circuit 105.

The RAM 101 is a storage that serves as a work area used by the CPU 103, when it performs a variety of types of data processing, and stores data whenever necessary. The oscillation circuit 104 is a circuit that generates a reference clock signal of a fixed frequency. The motor control circuit 105 drives and controls the motor drive circuit 110, which drives the indicating hands, under the control of the CPU 103.

The CPU 103 controls the entire components, such as the motor control circuit 105, which is a computation device formed of a processor, a memory, and other peripheral devices. In particular, the CPU 103 so controls the motor control circuit 105 as to cause the display section 160 to drive and rotate one or more of the indicating hands 13 for notification of the time information. In this process, the CPU 103 can cause the display section 160 to display the current time on the basis of current time information acquired, for example, from a GPS satellite.

The CPU 103 further has a function of so controlling the motor control circuit 105 as to cause the notification section 170 to notify the user of an event that unexpectedly occurs, such as an event in which alarm time has been reached and an event in which a telephone call or an electronic mail message has arrived at and has been received by the apparatus 1 or another communication apparatus.

The specified display position used herein to which an indicating hand 13 is moved depends on the type of trigger. For example, the full circle can be divided into 12 major items each formed of a 5-second area. The display position can then be allocated in accordance with a produced trigger, for example, to the following items: items that notify the user of "Reception of mail message from family member;" "Reception of mail message from friend;" "Reception of mail message from office;" "Arrival of telephone call from family member;" "Arrival of telephone call from friend;" "Arrival of telephone call from office;" and "Reception of message from SNS or submission of message to SNS;" and items that notify the user of requests to "Come and pick me up;" and "Contact me."

In a case where the notification section 170 performs the notification by causing an indicating hand 13 to make reciprocating motion in the forward and reverse directions over a range including the display position, the CPU 103 changes the speed of the reciprocating motion on the basis of the type of trigger. The speed of the reciprocating motion can, for example, be set at 8 Hz, 16 Hz, and 32 Hz.

When the notification section 170 performs the notification, the CPU 103 further changes the amplitude of the reciprocating motion on the basis of the type of trigger. The amplitude can range, for example, from ±1 second to ±5 seconds.

To notify the user of hierarchized predetermined information, the CPU 103 may determine to change the speed of the reciprocating motion and/or the amplitude thereof. For example, the predetermined information is hierarchized into an upper level, an intermediate level, and a lower level. In this case, the predetermined information includes first information that belongs to the upper hierarchy, second information that belongs to the intermediate hierarchy, and third information that belongs to the lower hierarchy. In the present embodiment, the display position can be allocated to the notification of the first information. The first information may, for example, represent the type of event. In this case, the type of event can, for example, be arrival of a telephone call, arrival of a mail message, and arrival of an SNS message.

The amplitude of the reciprocating motion can be allocated to the notification of the second information. The second information may, for example, represent the arrival destination. In this case, the arrival destination can, for example, be "Father," "Mother," "Wife," "Child 1," and "Child 2." For example, the amplitude of the reciprocating motion can be set as follows: The reciprocating motion has an amplitude of ±5 seconds when the arrival destination is "Father;" the reciprocating motion has an amplitude of ±4 seconds when the arrival destination is "Mother;" the reciprocating motion has an amplitude of ±3 seconds when the arrival destination is "Wife;" the reciprocating motion has an amplitude of ±2 seconds when the arrival destination is "Child 1;" and the reciprocating motion has an amplitude of ±1 seconds when the arrival destination is "Child 2."

Further, the speed of the reciprocating motion can be allocated to the third information. The third information may, for example, represent the importance. In this case, the speed of the reciprocating motion can be set as follows: The speed of the reciprocating motion is set at "32 Hz" when an event having occurred has high importance; the speed of the reciprocating motion is set at "16 Hz" when an event having occurred has intermediate importance; and the speed of the reciprocating motion is set at "8 Hz" when an event having occurred has low importance. The importance can be set by default on the basis of typical tendencies or can be customized by the user.

The reason why the first information, which belongs to a hierarchy higher than the hierarchy to which the second information belongs, is displayed by using the display position is as follows: That is, the display position of an indicating hand 13 can be grasped at the instant of visual recognition. On the other hand, the second information and the third information, each of which belongs to a hierarchy lower than the hierarchy to which the first information belongs, are displayed by causing the indicating hand to make reciprocating motion in the forward and reverse directions. It takes longer time to grasp the reciprocating motion of the indicating hand 13 than the time required to grasp the display position of the indicating hand 13. Information that belongs to an upper hierarchy can therefore be so displayed as to be more readily grasped, whereby user friendliness can be improved.

The display position is allocated to the first information, the amplitude of the reciprocating motion is allocated to the second information, and the speed of the reciprocating motion is allocated to the third information in the above description, but the invention is not limited to the settings described above. The display position, the amplitude of the reciprocating motion, and the speed of the reciprocating motion may be allocated to any of the pieces of information described above. For example, the display position may be allocated to the first information, the speed of the reciprocating motion may be allocated to the second information, and the amplitude of the reciprocating motion may be allocated to the third information.

That is, the display position may be allocated to the first information, and the action of the reciprocating motion may be allocated to the second information, which belongs to a hierarchy lower than the hierarchy to which the first information belongs.

The CPU 103 can control the motor control circuit 105 in such a way that the rotation speed or the rotation direction is changed when the second indicating hand 13c is moved to the display position. The change in the rotation speed or the rotation direction used herein means a change to a speed or a direction different from the rotation speed or the rotation direction of an indicating hand at the time of regular time display.

When the CPU 103 accepts notification termination operation via the operation button 17 or 18, the CPU 103 terminates the notification action and returns to action of notifying the user of the time information. The notification termination operation is not limited to operation of pressing the operation button 17 or 18. For example, in a case where the wristwatch-type notification apparatus 1 includes an acceleration sensor or any other sensor, tapping the entire apparatus and inclining the apparatus can be accepted as the notification termination operation.

The flash memory 102 is a storage that stores a variety of programs and parameters in advance. In the present embodiment, the flash memory 102 stores, as event setting information, information on the settings of the display position, the speed of the reciprocating motion, the amplitude of the reciprocating motion, and other factors allocated to the items described above (including upper level, middle level, and low level).

Notification Performed by Wristwatch-Type Notification Apparatus 1

Figure 7:
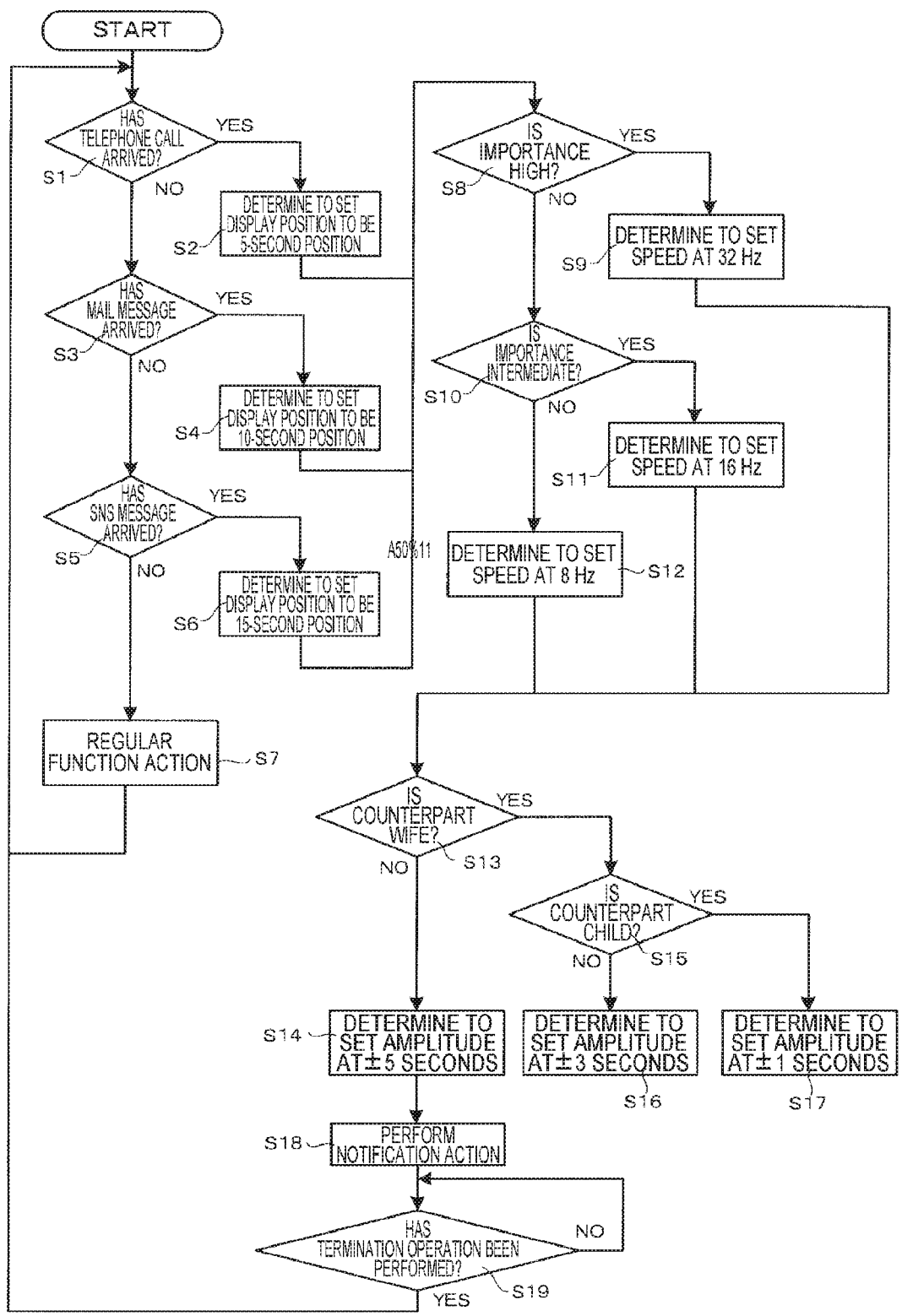
FIG. 7 is a flowchart showing an example of the procedure of a notification process in the wristwatch-type notification apparatus according to the first embodiment of the invention.

A description will be made of a process of notifying the user of event occurrence in the wristwatch-type notification apparatus 1. FIG. 7 is a flowchart showing the procedure of the notification process in the wristwatch-type notification apparatus 1.

It is assumed in the description that the display section 160 is driving and rotating a plurality of the indicating hands 13 to notify the user of the time information. During the rotational driving, the CPU 103 evaluates whether or not a trigger produced in accordance with event information has been inputted to the input/output interface 140. Specifically, the type of application executed in the mobile terminal is first determined. In FIG. 7, it is evaluated whether or not an operation signal transmitted from the mobile terminal represents arrival of a telephone call (S1 in FIG. 7). When a result of the evaluation shows that a telephone call has arrived (YES in S1 in FIG. 7), it is determined to set the display position to be the 5-second position and cause an indicating hand to make reciprocating motion over a range the center of which is the 5-second position (S2 in FIG. 7). On the other hand, when a result of the evaluation shows that the application executed in the mobile terminal has not transmitted an operation signal representing arrival of a telephone call (NO in S1 in FIG. 7), it is evaluated whether or not a mail message has been received (S3 in FIG. 7).

When a result of the evaluation shows that a mail message has been received (YES in S3 in FIG. 7), it is determined to set the display position to be the 10-second position and cause the indicating hand to make reciprocating motion over a range the center of which is the 10-second position (S4 in FIG. 7). On the other hand, when a result of the evaluation shows that the application executed in the mobile terminal has not transmitted an operation signal representing arrival of a mail message (NO in S3 in FIG. 7), it is evaluated whether or not an SNS message or any other message has been received (S5 in FIG. 7).

When a result of the evaluation shows that an SNS message or any other message has been received (YES in S5 in FIG. 7), it is determined to set the display position to be the 15-second position and cause the indicating hand to make reciprocating motion over a range the center of which is the 15-second position (S6 in FIG. 7). On the other hand, when a result of the evaluation shows that an SNS message or any other message has not been received (NO in S5 in FIG. 7), it is determined that no information on an event has been received from another communication apparatus, and the regular function action is continued (S7 in FIG. 7).

After the display position is determined (S2, S4, or S6 in FIG. 7), the CPU 103 changes the speed of the reciprocating motion on the basis of the importance of the trigger. The CPU 103 first evaluates whether or not the operation signal transmitted from the mobile terminal has the highest importance (S8 in FIG. 7). When a result of the evaluation shows that the operation signal has the highest importance (YES in S8 in FIG. 7), it is determined to set the speed of the reciprocating motion at 32 Hz (S9 in FIG. 7). On the other hand, when a result of the evaluation shows that the operation signal does not have the highest importance (NO in S8 in FIG. 7), it is evaluated whether or not the operation signal has the intermediate importance (S10 in FIG. 7).

When a result of the evaluation shows that the operation signal has the intermediate importance (YES in S10 in FIG. 7), it is determined to set the speed of the reciprocating motion at 16 Hz (S11 in FIG. 7). On the other hand, when a result of the evaluation shows that the operation signal does not have the intermediate importance (NO in S10 in FIG. 7), it is determined that the operation signal has the low importance and the speed of the reciprocating motion is set at 8 Hz (S12 in FIG. 7).

After the importance is evaluated, the CPU 103 changes the amplitude of the reciprocating motion on the basis of the type of the arrival destination. It is assumed in the description that the wife, a child, and others have been registered as the arrival destination. The CPU 103 first evaluates whether or not the counterpart at the arrival destination is the wife (S13 in FIG. 7). When a result of the evaluation shows that the counterpart at the arrival destination is the wife (YES in S13 in FIG. 7), it is determined to set the amplitude of the reciprocating motion at ±5 seconds (S14 in FIG. 7). On the other hand, when a result of the evaluation shows that the counterpart at the arrival destination is not the wife (NO in S13 in FIG. 7), it is evaluated whether or not the arrival destination is the child (S15 in FIG. 7).

When a result of the evaluation shows that the counterpart at the arrival destination is the child (YES in S15 in FIG. 7), it is determined to set the amplitude of the reciprocating motion at ±3 seconds (S16 in FIG. 7). On the other hand, when a result of the evaluation shows that the counterpart at the arrival destination is not the child (NO in S15 in FIG. 7), it is determined that the counterpart at the arrival destination is the others and determined to set the amplitude of the reciprocating motion at ±1 seconds (S17 in FIG. 7).

The information on the settings of the display position, the speed of the reciprocating motion, the amplitude of the reciprocating motion determined by the CPU 103 as described above is transmitted to the motor control circuit 105, and the motor control circuit 105 controls the motor drive circuit 110 on the basis of the information on the settings. The motor drive circuit 110 so drives the notification section 170 as to cause it to move any of the indicating hands 13 to the display position specified in accordance with predetermined information associated with the trigger and cause the indicating hand 13 to make reciprocating motion in the forward and reverse directions over a range including the display position (S18).

The CPU 103 then evaluates whether or not the user has performed the termination operation (S19 in FIG. 7). When a result of the evaluation shows that the termination operation has been performed (YES in S19 in FIG. 7), the CPU 103 terminates the notification action. The display section 160 then performs the regular time display action.

On the other hand, when a result of the evaluation shows that the termination operation has not been performed (NO in S19 in FIG. 7), the CPU 103 allows the notification action to continue until the termination operation is performed.

As described above, in the present embodiment, in the normal operation, the time information on the time, calendar, and other factors of which the user should be originally notified by the indicating hands 13 is displayed, whereas when unexpected event processing occurs, for example, when alarm time has been reached and when a mail message has arrived, an indicating hand 13 is moved to the display position specified in accordance with predetermined information associated with a produced trigger, and the indicating hand 13 is then caused to make reciprocating motion in the forward and reverse directions over a range including the display position. The user can grasp by looking at the reciprocating motion of the indicating hand 13 that a trigger has been produced and can also quickly grasp the type of the produced trigger by looking at the amplitude of the reciprocating motion of the indicating hand 13 at the instant of visual recognition.

Further, according to the present embodiment, since the speed of the reciprocating motion is changed on the basis of the type of trigger, the user can grasp the importance of a mail message having arrived, a period elapsed since alarm time has been reached, and other pieces of information in the form of the speed of the reciprocating motion of the indicating hand 13.

Further, in the present embodiment, since the amplitude of the reciprocating motion is changed on the basis of the type of trigger, the user can grasp the importance of a mail message having arrived, a period elapsed since alarm time has been reached, and other pieces of information in the form of the amplitude of the reciprocating motion of the indicating hand 13.

In the present embodiment, the speed of the reciprocating motion is classified into "32 Hz," "16 Hz," and "8 Hz," but the speed can be arbitrarily set. In the case where the speed is "8 Hz" and the amplitude is ±5 seconds, one cycle of the reciprocating motion in the forward and reverse directions is completed in (5+5)/8=1.25 seconds. During the period, the user does not necessarily keep looking at the wristwatch-type notification apparatus 1 for 1.25 seconds at the maximum, but the user can first instantly grasp the position of the hand and the moving speed thereof. The user can then anticipate the amplitude and look at the indicating hand 13 multiple times for a short period each time for grasping the amplitude. That is, the user can look at the wristwatch-type notification apparatus 1 and grasp multiple pieces of information in several stages, for example, by first grasping the first information in the display position, grasping the second information in the form of the speed, and finally grasping the third information in the form of the amplitude.

Second Embodiment

Figure 8:
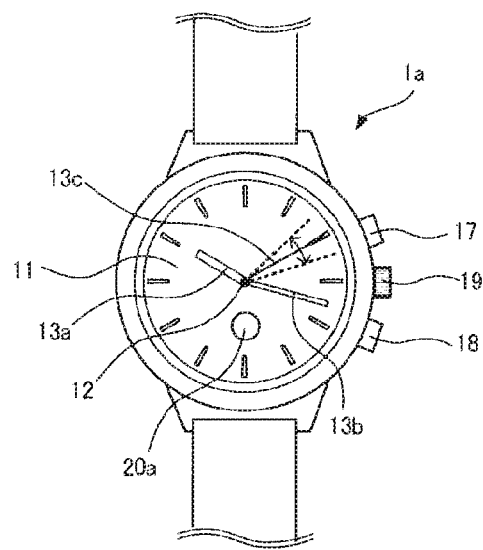
FIG. 8 is an exterior view showing an example of a wristwatch-type notification apparatus according to a second embodiment of the invention.
Figure 9:
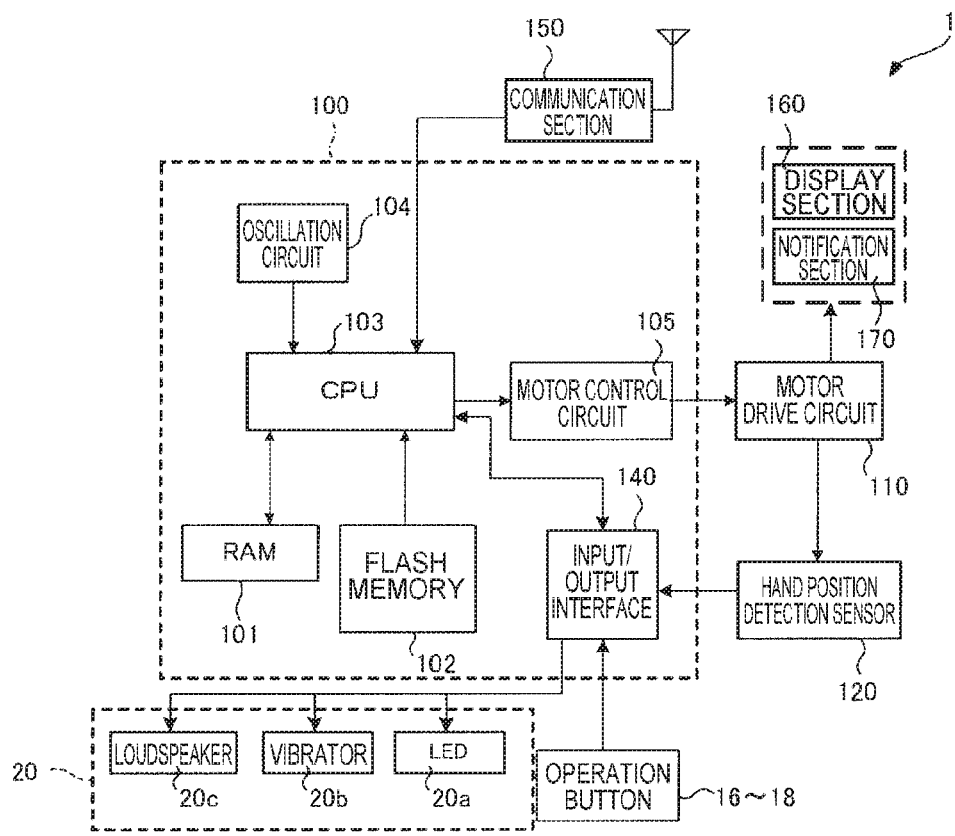
FIG. 9 is a block diagram showing an example of a key part configuration of the wristwatch-type notification apparatus according to the second embodiment.

A second embodiment of the invention will next be described. The present embodiment is characterized in that before the user is notified of event occurrence, a pre-informing process of informing the user in advance that notification action is carried out. FIG. 8 is an exterior view of a wristwatch-type notification apparatus 1*a* according to the second embodiment, and FIG. 9 is a block diagram showing a key part configuration of the wristwatch-type notification apparatus 1*a* according to the second embodiment.

In the present embodiment, an LED 20*a*, which is one type of pre-informing section 20*a*, is provided on a display screen of the apparatus, as shown in FIG. 8. In the present embodiment, the LED 20*a*, a loudspeaker 20*c*, or a vibration device 20*b* is provided as the pre-informing section, as shown in FIG. 9. The pre-informing section 20 is connected to the input/output interface 140, and when the pre-informing section 20 acquires a notification start signal from the CPU 103, the pre-informing section 20 calls the user's attention in the form of light-up or blink action of the LED 20*a*, an alarm outputted from the loudspeaker 20*c*, or vibration of the driven vibration device 20*b* as a preliminary step of the notification action performed by the notification section 170. As the pre-informing process, at least any of the light, the loudspeaker, and the vibrator may be provided, or the combination of the light, the loudspeaker, the vibrator, and other components may be used.

According to the present embodiment described above, since light, sound, vibration, or any other form is used to inform the user that the notification action is performed as the preliminary step of the notification action, the user can recognize that the user will be notified, whereby the user can immediately check the notification. Further, performing the pre-informing action described above allows the user to recognize that the user will be notified, whereby the apparatus can terminate the notification in a predetermined period, for example, without reception of the user's notification termination operation. As a result, the power consumption can be lowered.

The LED 20*a*, the loudspeaker 20*c*, and the vibration device 20*b* used as the pre-informing section 20 may be combined with the notification action of causing an indicating hand 13 to make reciprocating motion in the forward and reverse directions over a range including the display position for more elaborate notification. In this case, the intensity, length, interval, pitch, and other factors of the light, sound, and vibration can be combined with one another for the notification.

Third Embodiment

A third embodiment of the invention will next be described. The present embodiment is characterized in that the power consumed in the notification action is lowered.

In the present embodiment, after notification action is once performed, and an indicating hand 13 is caused to make reciprocating motion in the forward and reverse directions over a range including the display position, the action of notifying the user of the time information is performed again, and the action of causing the indicating hand 13 to make the reciprocating motion in the forward and reverse directions over the range including the display position is resumed.

For example, the notification action is performed for one minute, and the action of notifying the use of the time information is then performed for 50 seconds. The notification action may then be performed again for 10 seconds. Thereafter, the time information display action for 50 seconds and the notification action for 10 seconds are repeated until the notification termination operation is performed.

According to the present embodiment described above, since instead of keeping performing the notification action, the notification action and then the time information display action are repeated, the user can be reliably notified of event occurrence with power consumption lowered. As a result, the invention is also applicable, for example, to a wristwatch that makes up shortage of electric power, for example, with the aid of a solar panel.

Fourth Embodiment

In the embodiments described above, the wristwatch-type notification apparatus 1 is connected to a mobile terminal via the communication section 150, but the invention is not limited to the configuration described above. For example, the wristwatch-type notification apparatus 1 itself may have the mobile terminal function of receiving a telephone call and a mail message.

Further, IOT (Internet of Things) may be used for direct connection of the wristwatch-type notification apparatus 1 to a communication network. In this case, another apparatus (such as air conditioner, refrigerator, and crime prevention apparatus) connected to the communication network can transmit information, for example, on the state of the apparatus to the wristwatch-type notification apparatus 1, and the wristwatch-type notification apparatus 1 can notify the user thereof of the state.

Further, for example, the invention is also applicable to the wristwatch-type notification apparatus 1 paired with a mobile terminal (smartphone). Moreover, the wristwatch-type notification apparatus 1 may be provided with a telephone call profile in Classic Bluetooth (registered trademark) or the VoIP function in Wi-Fi (registered trademark) to allow the user to make a telephone call through the wristwatch-type notification apparatus 1.

Fifth Embodiment

A fifth embodiment of the invention will next be described. In the present embodiment, a description will be made of a process to be carried out in a case where at least two events occur in an overlapping manner.

In the present embodiment, the flash memory 102 has a buffer that stores an event occurrence history. It is now, for example, assumed that a mail message had arrived but the user had not noticed mail message arrival notification and a telephone call has then arrived. In this case, the wristwatch-type notification apparatus 1 saves information on the mail message arrival in the buffer and performs notification action of notifying the user of the telephone call arrival. Thereafter, when the user operates the wristwatch-type notification apparatus 1 to terminate the telephone call arrival notification, the wristwatch-type notification apparatus 1 reads the information on the mail message arrival from the buffer and notifies the user of the mail message arrival.

In the above description, the user is first notified of the arrival of the telephone call, which is an event having occurred later. Instead, the order of the notification may be so changed that the notification is performed in accordance with the priorities of the events. In detail, when a plurality of events having occurred are accumulated in the buffer, the buffering is controlled in accordance with the priorities of the events although the buffering is typically performed in a FIFO (first in first out) or LIFO (last in first out) scheme.

Figure 10:
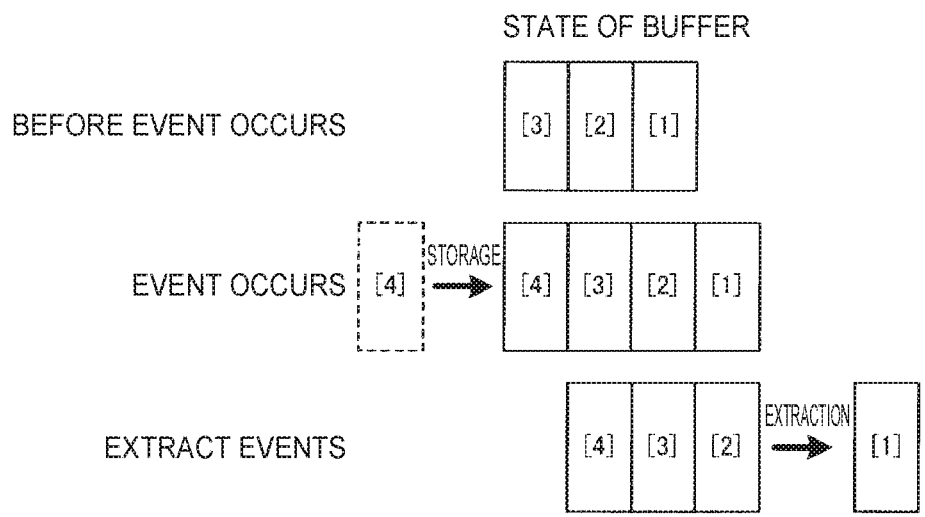
FIG. 10 is a descriptive diagram showing an example of FIFO action according to a fifth embodiment of the invention.

FIG. 10 shows an example of the FIFO action. In the example shown in FIG. 10, before event occurrence, the buffer has stored an event [1], an event [2], and an event [3] in the chronological order. In this state, when an event [4] occurs, the buffer stores the event [4] after the event [3]. Thereafter, to extract the events from the buffer, the event [1], which has been stored first, is extracted. That is, the events are extracted in a descending order of the time when an event is stored in the buffer.

Figure 11:
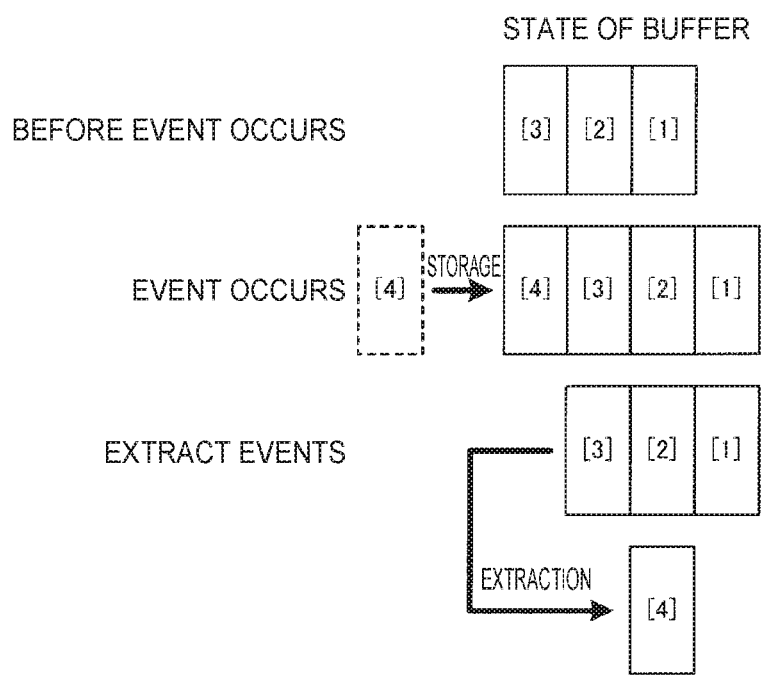
FIG. 11 is a descriptive diagram showing an example of LIFO action according to the fifth embodiment.

FIG. 11 shows an example of the LIFO action. In the example shown in FIG. 11, before event occurrence, the buffer has stored the event [1], the event [2], and the event [3] in the chronological order. In this state, when an event [4] occurs, the buffer stores the event [4] after the event [3]. Thereafter, to extract the events from the buffer, the event [4], which has been stored last, is extracted. That is, the events are extracted in an ascending order of the time when an event is stored in the buffer.

For example, information transmitted in the form of a mail message typically has a content that only needs to be read in one to several hours. In other words, it can be said that the degree of emergency of a mail message is relatively low, and that time restriction imposed by a mail message on the recipient is low. On the other hand, a telephone call is a method used because a caller desires to meet and speak with a receiver but is unable to travel to the location where the receiver is present due to time restriction or used in a case where the caller desires to communicate with the receiver immediately. In other words, it can be said that the degree of emergency of a telephone call is higher than in a case where other communication methods are used, and that time restriction imposed by a telephone call on the receiver is high. Still on the other hand, informing action based on an SNS and other similar media, which have been increasingly popular in recent years, does not impose high promptness, and it can be said that the time restriction imposed by an SNS message on a recipient is so low that a recipient only needs to be eventually know the content of the message. An alarm used when a person gets up in the morning, a meeting schedule, and others are believed to have priority higher than that of a mail message but lower than that of a telephone call or similar to that of a telephone call. A message requesting a family member to come and pick up a message sender and a mail message from a family member are believed to have priority equal to that of an alarm. The priorities described above may be set by default in some cases on the basis of the typical tendencies described above or may be desired to be changed depending on a person. The order of items may therefore be customized by the user.

In a case where events having the same priority occur in an overlapping manner, the events can be handled in accordance with chronological priorities. For example, it is assumed that the priorities are set in the order of telephone call→alarm→mail message.

Figure 12:
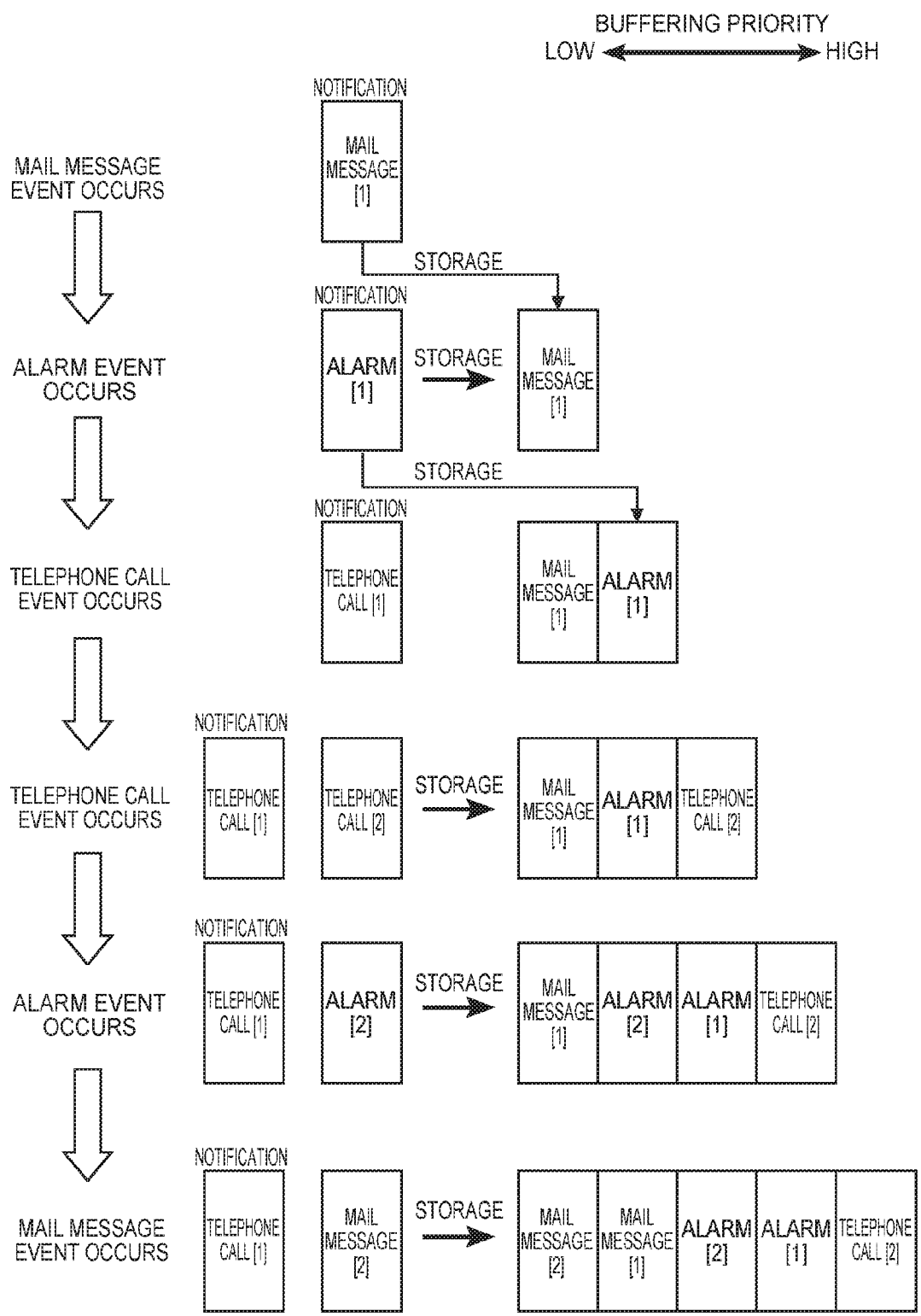
FIG. 12 is a descriptive diagram showing a specific example of buffering control on the basis of priorities according to the fifth embodiment.

FIG. 12 shows a specific example of the buffering control in a case where priorities are set. In this example, a case where events are successively occur in a short period in the order of a mail message [1], an alarm [1], a telephone call [1], a telephone call [2], an alarm [2], and a mail message [2] is assumed. After all the events are completed, as an example of notification made to the user who starts checking the events, first, at the point of time when the mail message [1] is received, the mail message [1] is displayed. Thereafter, when the alarm [1] occurs, the alarm [1], which has higher priority than that of the mail message [1], is displayed, and in a case where the notification of the mail message [1] has not been read, the mail message [1] is buffered. Thereafter, when the telephone call [1] occurs, the alarm [1], which has lower priority than that of the telephone call [1], is buffered, and notification of the telephone call [1] is made. At this point, since the alarm [1] has higher priority than that of the mail message [1] having been already buffered, the alarm [1] is so buffered at a higher level as to be performed earlier than the mail message [1]. When the telephone call [2] further occurs, since the telephone call [2] has the same priority as that of the telephone call [1] currently under notification, the notification of the telephone call [1] is maintained in accordance with the chronological priorities. That is, the telephone call [1] is not buffered. When the alarm [2] and the mail message [2] subsequently occur, since the telephone call [1] currently under notification has higher priority, the notification of the telephone call [1] is maintained. As a result, the telephone call [2], the alarm [1], the alarm [2], the mail message [1], and the mail message [2] are stacked in the buffer in descending order of priority.

When the user terminates the notification of the telephone call [1], the user is notified of the telephone call [2] stacked in the highest level in the buffer. Thereafter, whenever the user terminates the notification, the user is sequentially notified of the event stacked at a lower level. In this process, if events to be extracted have the same priority, the user is notified of the event having been stacked chronologically earlier by priority. After the user is notified of the last stacked event, and the user terminates the notification, the regular second display is restored.

As described above, in the case where a plurality of triggers occur in association with respective pieces of predetermined information, the notification section 170 can notify the user of the plurality of pieces of predetermined information in accordance with the priorities specified in advance. In particular, specifying priorities in association with the first information in the case where a plurality of triggers occur in association with respective pieces of predetermined information allows the pieces of predetermined information can be displayed in accordance with the priorities specified in the upper-hierarchy classification.

Variations

The invention is not limited to the embodiments described above, and a variety of variations that will, for example, be described below are conceivable. Further, arbitrarily selected one or more of the aspects of the variations described below can be combined with each other as appropriate.

Variation 1

Figure 13:
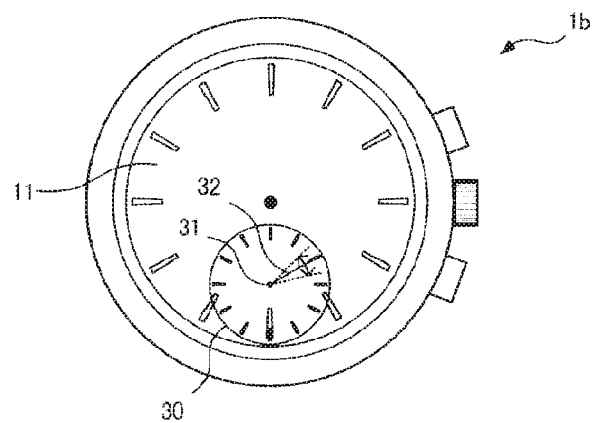
FIG. 13 shows an example of the exterior of a wristwatch-type notification apparatus according to a variation of the invention.

FIG. 13 is an exterior view of a wristwatch-type notification apparatus 1b according to Variation 1. The wristwatch-type notification apparatus 1b has a built-in sensor for displaying the altitude and the atmospheric pressure. In the present Variation 1, a display section 30 having a circular shape in a plan view is formed in the 6-o'clock position on the dial 11, as shown in FIG. 13. A secondary shaft 31 passes through the window section 30, and a small hand 32, which is rotatable by 360°, is disposed in a central portion of the display section 30 in a plan view. The small hand 32 displays a value measured with the sensor, such as the altitude and the atmospheric pressure. In the present Variation 1, to notify the user of an event representing that a pre-specified condition is satisfied, the small hand 32 in the window section 30 moves, on the basis of a trigger produced in accordance with the event, to a display position specified in accordance with the type of the event associated with the trigger and makes reciprocating motion in the forward and reverse directions over a range including the display position. The small hand 32, which displays information other than the time information, can therefore be used to notify the user of the event.

The display position, the amplitude, and the speed of the reciprocating motion made by the small hand 32 are the same as those in the embodiments described above and are therefore not described.

Variation 2

Figure 14:
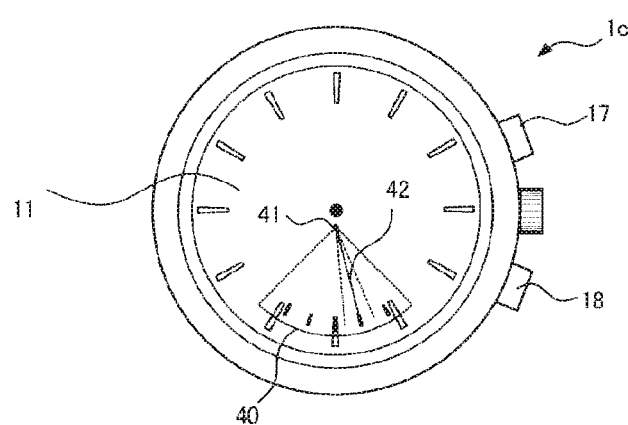
FIG. 14 shows an example of the exterior of a wristwatch-type notification apparatus according to a variation of the invention.

FIG. 14 is an exterior view of a wristwatch-type notification apparatus 1c according to Variation 2. The wristwatch-type notification apparatus 1c operates not only in a time display mode in which the time is displayed but also in a stopwatch mode that provides a stopwatch function of starting measurement in response to operation of the operation button 17 and stops the measurement in response to operation of the operation button 18, an activity level mode in which an activity level is displayed on the basis of an output from a built-in acceleration sensor, and other modes.

In the present Variation 2, a display section 40, which has a fan-like shape having an arcuate portion facing downward in a plan view, is formed in the 6-o'clock position on the dial 11, as shown in FIG. 14. In the window section 40, a small hand 42, through which a secondary shaft 41 passes and which is therefore rotatable, is provided at the vertex of the display section 40 in a plan view. The small hand 42 displays the type of mode. In the present Variation 2, to notify the user of an event representing that a pre-specified condition is satisfied, the small hand 42 in the display section 40 moves, on the basis of a trigger produced in accordance with the event, to a display position specified in accordance with the type of the event associated with the trigger and makes reciprocating motion in the forward and reverse directions over a range including the display position. The small hand 42, which displays information other than the time information, can therefore be used to notify the user of the event.

The display position, the amplitude, and the speed of the reciprocating motion made by the small hand 42 are the same as those in the embodiments described above and are therefore not described.

Variation 3

Figure 15:
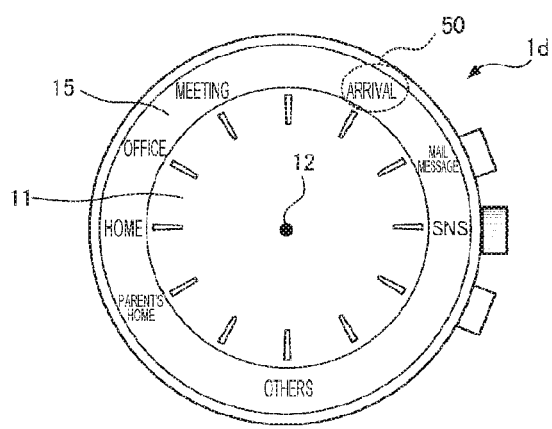
FIG. 15 shows an example of the exterior of a wristwatch-type notification apparatus according to a variation of the invention.

FIG. 15 is an exterior view of a wristwatch-type notification apparatus 1d according to Variation 3. In the present Variation 3, notification items 50 are displayed on the bezel 15, as shown in FIG. 15. In the present variation, the notification items are disposed in portions outside the bar-type indices. According to the present variation, in which the notification items are written in the display positions of an indicating hand 13 that makes reciprocating motion, the content of notification can be readily grasped.

Variation 4

The above embodiments and variations have been described with reference to an analog wristwatch. Instead, for example, the invention is also applicable to a timepiece in which the display screen is so configured that the indicting hands 13 are expressed by 60 radially arranged segments and a timepiece in which video images of rotating indicating hands 13 are displayed in the form of bitmap images or any other format images.

Also in this case, the timepiece includes a notification section that notifies the user of the time information by displaying images of one or more of the indicating hands displayed in the form of the segments or bitmap or any other format images and a notification section that notifies the user of event information representing that a pre-specified condition is satisfied by moving, on the basis of a trigger produced in accordance with the event information, an indicating hand to a display position specified in accordance with the type of the event information associated with the trigger and causing the indicating hand to make reciprocating motion in the forward and reverse directions over a range including the display position. When an unexpected event processing occurs, the indicating hand is moved to the display position specified in accordance with the type of the event information associated with the produced trigger and caused to make the reciprocating motion in the forward and reverse directions over the range including the display position. Also in this case, the user can grasp that a trigger has been produced by looking at the reciprocating motion of the indicating hand displayed in the form of bitmap or any other format images and can further quickly grasp the type of the produced trigger at the instant of visual recognition by looking at the range over which the indicating hand is making the reciprocating motion. Even in a wristwatch-type notification apparatus of this type, the speed and amplitude of the reciprocating motion are changed on the basis of the type of the trigger. In this case, a period elapsed since alarm time has been reached, the importance of a mail message having arrived, and other factors can be expressed in the form of the speed and amplitude of the reciprocating motion of the indicating hand 13 to notify the user of a more detailed type of the trigger.

Variation 5

In each of the embodiments described above, the CPU 103, the motor control circuit 105, and the motor drive circuit 110 are components separate from the notification section 170, but the notification section 170 may instead include the CPU 103, the motor control circuit 105, and the motor drive circuit 110. That is, the notification section 170 may notify the user of predetermined information representing that a predetermined condition is satisfied by moving, on the basis of a trigger produced in accordance with the predetermined information, an indicating hand 13 to a display position specified in accordance with the predetermined information and causing the indicating hand 13 to make reciprocating motion in the forward and reverse directions over a range including the display position.

The entire disclosure of Japanese Patent Application No. 2016-014378, filed Jan. 28, 2016 is expressly incorporated by reference herein.

What is claimed is:

1. A wristwatch-type notification apparatus comprising:
a display section that uses an indicating hand to provide a notification to a user of any of a plurality of previously identified conditions; and
a notification section that notifies the user of the previously identified condition by moving the indicating hand to a display position specified in accordance with the previously identified condition and causing the indicating hand to make reciprocating motion over a range including the display position,
wherein the notification is triggered when an autonomous occurrence of any of the plurality of previously identified conditions occurs, and
wherein a speed or an amplitude of the reciprocating motion of the indicating hand is changed in accordance with the previously identified condition.

2. The wristwatch-type notification apparatus according to claim 1,
wherein the previously identified condition includes first information and second information, and
the notification section moves the indicating hand to the display position according to the first information and causes the indicating hand to make reciprocating motion over a range including the display position in accordance with the second information.

3. The wristwatch-type notification apparatus according to claim 2, wherein the notification section changes an amplitude of the reciprocating motion in accordance with the second information.

4. The wristwatch-type notification apparatus according to claim 2,
wherein the previously identified condition includes third information, and
the notification section changes a speed of the reciprocating motion in accordance with the third information.

5. The wristwatch-type notification apparatus according to claim 2, wherein the notification section changes a speed of the reciprocating motion in accordance with the second information.

6. The wristwatch-type notification apparatus according to claim 5,
wherein the previously identified condition includes third information, and
the notification section changes an amplitude of the reciprocating motion in accordance with the third information.

7. The wristwatch-type notification apparatus according to claim 2, wherein the first information represents a type of an event.

8. The wristwatch-type notification apparatus according to claim 2, wherein the second information represents information on a person.

9. The wristwatch-type notification apparatus according to claim 4, wherein the third information represents information on action of the indicating hand.

10. The wristwatch-type notification apparatus according to claim 1, wherein the notification section includes a pre-informing section that informs the user before the notification section notifies the user of the predetermined information that the notification section starts the notification.

11. The wristwatch-type notification apparatus according to claim 2, wherein in a case where the previously identified condition having occurred is formed of a plurality of pieces of predetermined information, the notification section notifies the user of the plurality of pieces of predetermined information in accordance with priority specified in advance in association with the first information.

12. The wristwatch-type notification apparatus according to claim 1, wherein the display section notifies the user of the previously identified condition by driving and rotating the indicating hand or displaying an image of the indicating hand.

* * * * *